United States Patent
Murad et al.

(10) Patent No.: US 10,282,074 B2
(45) Date of Patent: May 7, 2019

(54) METHOD AND APPARATUS FOR ENHANCING TOP VIEW IMAGE

(71) Applicant: GM GLOBAL TECHNOLOGY OPERATIONS LLC, Detroit, MI (US)

(72) Inventors: Mohannad Murad, Troy, MI (US); Akram Abdel-Rahman, Ajax (CA); Sepehr Pourrezaei Khaligh, North York (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/455,371

(22) Filed: Mar. 10, 2017

(65) Prior Publication Data
US 2018/0260103 A1    Sep. 13, 2018

(51) Int. Cl.
*G06F 3/0484* (2013.01)
*G06F 3/0481* (2013.01)
*G06T 3/40* (2006.01)

(52) U.S. Cl.
CPC ...... *G06F 3/04845* (2013.01); *G06F 3/04817* (2013.01); *G06F 3/04842* (2013.01); *G06T 3/40* (2013.01); *G06F 2203/04806* (2013.01); *G06T 2200/24* (2013.01)

(58) Field of Classification Search
CPC ............ G06F 3/04845; G06F 3/04817; G06F 3/04842; G06F 2203/04806; G06T 3/40; G06T 2200/24
See application file for complete search history.

(56) References Cited

U.S. PATENT DOCUMENTS

| | | | |
|---|---|---|---|
| 2012/0087546 A1* | 4/2012 | Focke | B60R 1/00 382/104 |
| 2014/0362231 A1* | 12/2014 | Bietsch | G06T 7/20 348/169 |
| 2016/0311273 A1* | 10/2016 | Zaroor | B60C 23/0474 |
| 2017/0104907 A1* | 4/2017 | Rajhansa | H04N 5/2259 |

* cited by examiner

*Primary Examiner* — Chong Wu

(57) ABSTRACT

A method and apparatus for enhancing a top view image of a vehicle are provided. The method includes determining a trajectory of a vehicle or a trailer; and performing at least one from among zooming the top view image of the vehicle or trailer and panning the top view image, based on the determined trajectory. The method and apparatus may provide a better view of the surroundings of a vehicle in order to better navigate the vehicle, including the case where a trailer is hitched to the vehicle.

15 Claims, 4 Drawing Sheets

METHOD AND APPARATUS FOR ENHANCING TOP VIEW IMAGE

INTRODUCTION

Apparatuses and methods consistent with exemplary embodiments relate to displaying top view images of a vehicle. More particularly, apparatuses and methods consistent with exemplary embodiments relate to enhancing top view images of a vehicle.

SUMMARY

One or more exemplary embodiments provide a method and an apparatus that adjust a displayed top view image of a vehicle. More particularly, one or more exemplary embodiments provide a method and an apparatus that zoom in, zoom out, and/or pan a top view image of a vehicle based on one or more from among vehicle steering angle, the presence of a hitched trailer, and the respective dynamic trailer hitch angle.

According to an aspect of an exemplary embodiment, a method for enhancing a top view image of a vehicle or trailer is provided. The method includes determining a trajectory of a vehicle or a trailer, and performing at least one from among zooming the top view image of the vehicle or trailer and panning the top view image, based on the determined trajectory.

The determining the trajectory of the vehicle or the trailer may be performed based on at least one from among a steering angle of the vehicle, a wheel angle of the vehicle, a trailer hitch angle a heading of the vehicle, a speed of the vehicle, and a path of the vehicle.

The method may further include determining whether a trailer is hitched to the vehicle.

The performing the at least one from among the zooming the top view image and the panning of the top view image may be performed based on the determined trajectory and based on whether the trailer is hitched to the vehicle.

The zooming the top view image may include zooming out of the top view image in response to the trailer being hitched to the vehicle and zooming into the top view image in response to the trailer being unhitched from the vehicle.

The panning the top view image may include panning the image to the right in response to the determined trajectory of the vehicle or trailer being a rightward trajectory and panning the image to the left in response to the determined trajectory of the vehicle or trailer being a leftward trajectory.

The panning the image may include panning the image to the right for a distance determined based on the rightward trajectory and panning the image to the left for a distance determined based on the leftward trajectory.

The determining whether the trailer is hitched to the vehicle may include detecting a connection to the trailer or receiving a user input indicating that the trailer is hitched to the vehicle.

The zooming the top view image may include zooming into or zooming out of the top view image in response to a user selection of an icon on the top view image.

The method may further include receiving a plurality of images from a plurality of cameras disposed on a vehicle, transforming the plurality of images to form the top view image, and displaying the top view image.

According to an aspect of another exemplary embodiment, an apparatus for enhancing a top view image of a vehicle or trailer is provided. The apparatus includes at least one memory comprising computer executable instructions; and at least one processor configured to read and execute the computer executable instructions. The computer executable instructions cause the at least one processor to: determine a trajectory of a vehicle; and perform at least one from among zooming into the top view image of the vehicle or trailer and panning the top view image, based on the determined trajectory.

The computer executable instructions may cause the at least one processor to determine the trajectory of the vehicle or the trailer based on at least one from among a steering angle of the vehicle, a wheel angle of the vehicle, a trailer hitch angle a heading of the vehicle, a speed of the vehicle, and a path of the vehicle.

The computer executable instructions may cause the at least one processor to determine whether a trailer is hitched to the vehicle.

The computer executable instructions may cause the at least one processor to perform the at least one from among the zooming the top view image and the panning of the top view image based on the determined trajectory and based on whether the trailer is hitched to the vehicle.

The computer executable instructions may cause the at least one processor to zoom the top view image by zooming out of the top view image in response to the trailer being hitched to the vehicle and zooming into the top view image in response to the trailer being unhitched from the vehicle.

The computer executable instructions may further cause the at least one processor to pan the top view image by panning the image to the right in response to the determined trajectory of the vehicle or trailer being a rightward trajectory and panning the image to the left in response to the determined trajectory of the vehicle or trailer being a leftward trajectory.

The computer executable instructions may further cause the at least one processor to pan the image by panning the image to the right for a distance determined based on the rightward trajectory and panning the image to the left for a distance determined based on the leftward trajectory.

The computer executable instructions may further cause the at least one processor to determine whether the trailer is hitched to the vehicle by detecting a connection to the trailer or receiving a user input indicating that the trailer is hitched to the vehicle.

The computer executable instructions may further cause the at least one processor to zoom into the top view image by zooming into or zooming out of the top view image in response to a user selection of an icon on the top view image.

The apparatus may further include a plurality of cameras disposed on a vehicle. The computer executable instructions may cause the at least one processor to receive a plurality of images from a plurality of cameras disposed on a vehicle, transform the plurality of images to form the top view image of the vehicle and display the top view image of the vehicle or trailer.

The apparatus may further include a display configured to display the top view image of the vehicle.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
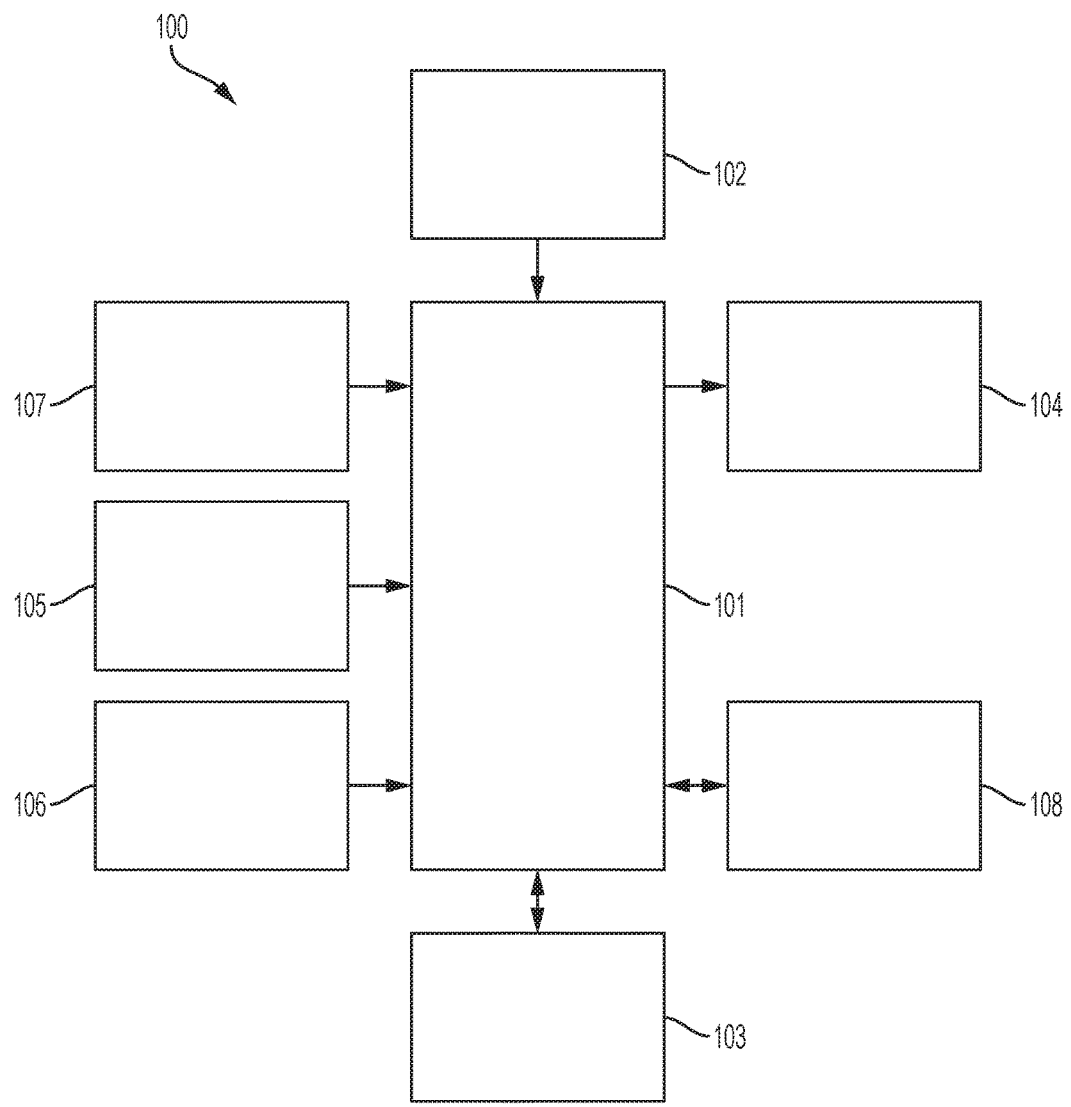
FIG. 1 shows a block diagram of an apparatus that enhances a top view image of a vehicle or trailer according to an exemplary embodiment.

An apparatus and method that enhances a top view image of a vehicle will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles may include a plurality of cameras that provide images of an area around the vehicle including the obstacles present around the vehicle. These images may be used to provide a top view image of the vehicle to an operator of the vehicle. The top view image may show a predetermined radius around the vehicle. However, in some instances, an expanded view of one side of the vehicle would provide an operator of a vehicle with better view of an upcoming turn or other obstacle. In addition, an expanded radius or view may provide an operator of a vehicle with a view of the movement of a trailer that is hitched to the vehicle as well as the area around the trailer.

The expanded or enhanced view may be toggled by an operator of the vehicle or toggled based on one or more predetermined conditions. The one or more predetermined conditions may include whether or not a trailer is hitched to the vehicle, the direction of travel of the vehicle, the vehicle steering angle, the trailer hitch angle, and/or other information on vehicle movement. The predetermined conditions may toggle an expanded or enhanced view by panning or zooming the top view image to provide a better view of target area around the vehicle. The expanded or enhanced view image may then be displayed to an operator of the vehicle on a display inside of the vehicle.

FIG. 1 shows a block diagram of an apparatus that enhances a top view image of a vehicle 100 (i.e., an apparatus that enhances a top view image of a vehicle and/or trailer 100) according to an exemplary embodiment. As shown in FIG. 1, the apparatus that enhances a top view image of a vehicle 100, according to an exemplary embodiment, includes a controller 101, a power supply 102, a storage 103, an output 104, a surround view camera 105, a user input 106, a trailer detector 107, and a communication device 108. However, the apparatus that enhances a top view image of a vehicle 100 is not limited to the aforementioned configuration and may be configured to include additional elements and/or omit one or more of the aforementioned elements. The apparatus that enhances a top view image of a vehicle 100 may be implemented as part of a vehicle, as a standalone component, as a hybrid system between an on vehicle and off vehicle device, or in another computing device.

The controller 101 controls the overall operation and function of the apparatus that enhances a top view image of a vehicle 100. The controller 101 may control one or more of a storage 103, an output 104, a surround view camera 105, a user input 106, and a communication device 108 of the apparatus that enhances a top view image of a vehicle 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 may be configured to send and/or receive information from one or more of the storage 103, the output 104, the surround view camera 105, the user input 106, the trailer detector 107, and the communication device 108 of the apparatus that enhances a top view image of a vehicle 100. The information may be sent and received via a bus or network, or may be directly read or written to/from one or more of the storage 103, the output 104, the user input 106, and the communication device 108 of the apparatus that enhances a top view image of a vehicle 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the surround view camera 105, the user input 106, the trailer detector 107, and the communication device 108, of the apparatus that enhances a top view image of a vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus that enhances a top view image of a vehicle 100. The storage 103 may be controlled by the controller 101 to store and retrieve information received from the surround view camera 105. The information may include information and/or one or more images taken by the surround view camera 105. In addition, the storage 103 may also include the computer instructions configured to be executed by a processor to perform the functions of the apparatus that enhances a top view image of a vehicle 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that enhances a top view image of a vehicle 100. The output 104 may include one or more from among a speaker, audio, a display, a centrally-located display, a head up display, a windshield display, a haptic feedback device, a vibration device, a tactile feedback device, a tap-feedback device, a holographic display, an instrument light, an instrument panel display, a center stack display, a rear view mirror display, a side view mirror display, an indicator light, etc.

According to one example, the output 104 may be one or more from among a center stack display, an instrument panel display or a heads up display. The output 104 may be configured to output one or more images from the surround view camera 105. The images may be processed or transformed and stitched together to show a top view image of a vehicle and the surrounding area. The output 104 may also display an image of the vehicle or a shape of the vehicle and obstacles in the surrounding area. In addition, the output 104 may output notifications including one or more from among an audible notification, a light notification, and a display notification.

The user input 106 is configured to provide information and commands to the apparatus that enhances a top view image of a vehicle 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle between views of the output 104. For example, the user input 106 may be configured to receive input to zoom into the top view image, zoom out of the top view image, and pan the top view image.

The surround view camera 105 may be one or more from among a camera, an infrared camera, a 360 degree camera, or a night vision camera. The surround view camera may include one or more cameras. In one example, the surround view camera may also include radar or laser imaging technology. According to an example, the surround view camera 105 may be mounted on a roofline, a trunk, a side view mirror, a door, a bumper, a hood, a grille, or a dashboard of the vehicle, etc. The images from the surround view camera 105 transformed for cropping, rotating, enlarging, and stitching in order to provide a top view image of the vehicle.

The trailer detector 107 may be a device that detects the presence of a trailer that is hitched to the vehicle. In particular, the trailer detector 107 may detect an electrical connection to the trailer, or may detect a trailer based on image taken by a camera, or may detect a trailer based on ultrasonic or radar sensor.

The communication device 108 may be used by apparatus that enhances a top view image of a vehicle 100 to communicate with various types of external apparatuses according to various communication methods. The communication device 108 may be used to send/receive image information to/from the surround view camera 105. In addition, the communication device 108 may be send image information to the output 104 to be output on a display of the apparatus that enhances a top view image of a vehicle 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an example, the controller 101 of the apparatus that enhances a top view image of a vehicle 100 may be configured to determine a trajectory of a vehicle; and perform at least one from among zooming into the top view image of the vehicle and panning the top view image of the vehicle, based on the determined trajectory. The controller 101 may be configured to receive a plurality of images from a plurality of cameras disposed on or around a vehicle, transform the plurality of images to form the top view image of the vehicle and display the top view image of the vehicle.

According to an example, the controller 101 of the apparatus that enhances a top view image of a vehicle 100 may be configured to determine the trajectory of the vehicle based at least one from among a steering angle of the vehicle, a wheel angle of the vehicle, a trailer hitch angle, a heading of the vehicle, a speed of the vehicle, and a path of the vehicle. In addition, the controller 101 may be configured to determine whether a trailer is hitched to the vehicle.

The controller 101 of the apparatus that enhances a top view image of a vehicle 100 may be configured to zoom into the top view image of the vehicle, zoom out of the top view image of the vehicle, and/or the pan of the top view image of the vehicle based on the determined trajectory and based on whether the trailer is hitched to the vehicle. The controller 101 may zoom into the top view image by decreasing the radius of the view around the vehicle and may zoom out of the top view image by increasing the radius of the view around the vehicle or to one side of the view vehicle. For example, the view to the right side and/or front side of the vehicle may be expanded with the view to the back side and/or left side of the vehicle remaining the same or being reduced.

In one example, the controller 101 may zoom out of the top view image of the vehicle when a trailer is hitched to the vehicle and zoom into the top view image of the vehicle when a trailer is unhitched or not hitched to a vehicle. In another example, the controller 101 may be configured to pan to the right of the image if the determined trajectory of the vehicle is a rightward trajectory and pan to the left of the image if the determined trajectory of the vehicle is a leftward trajectory. In yet another example, the controller 101 may be configured to zoom and/or pan the top view image of the vehicle based on a user input to select an icon or based on a user input to perform a gesture on the display.

Figure 2:
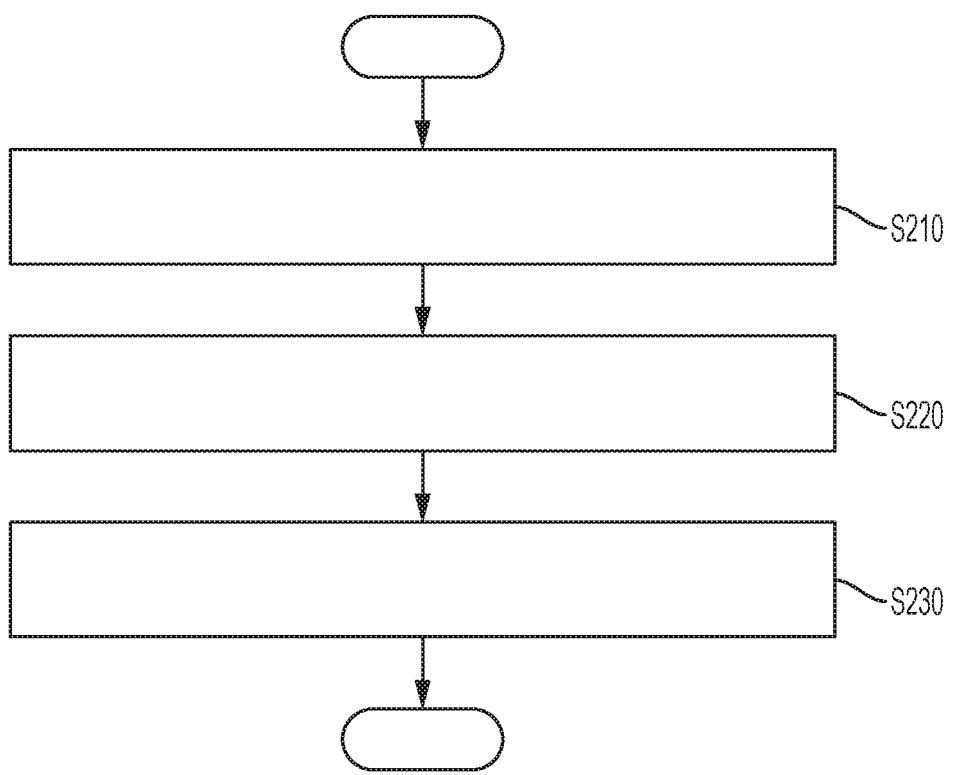
FIG. 2 shows a flowchart for a method of enhancing a top view image of a vehicle or trailer according to an exemplary embodiment.

FIG. 2 shows a flowchart for a method for enhancing a top view image of a vehicle and/or trailer according to an exemplary embodiment. The method of FIG. 2 may be performed by the apparatus that enhances a top view image of a vehicle 100 or may be encoded into a computer readable medium as instructions that are executable by a computer to perform the method.

Referring to FIG. 2, a top view image of a vehicle and its surroundings is displayed in operation 210. The top view image may also show a trailer that is attached to the vehicle. For example, the top view image may be generated by transforming and stitching together a plurality of images from a plurality of cameras placed on a vehicle.

In operation S220, the trajectory of the vehicle and/or trailer is determined. For example, the trajectory may be determined based on sensor data that includes one or more from among location data, map data, road angle, a steering angle of the vehicle, a wheel angle of the vehicle, a heading of the vehicle, a trailer hitch angle, a speed of the vehicle, and a path of the vehicle.

In operation S230, zooming into the top view image of the vehicle and/or trailer or panning the top view image of the vehicle and/or trailer may be performed based on the determined trajectory. In addition, other types of enhancement to the top view image may be performed to provide the operator of a vehicle a better view of the surroundings of the vehicle. Moreover, the enhancement of the image including zooming into the top view image of the vehicle and/or trailer or panning the top view image of the vehicle and/or trailer may be performed may be performed based on other conditions such as the presence or location of objects outside of the vehicle.

Figure 3:
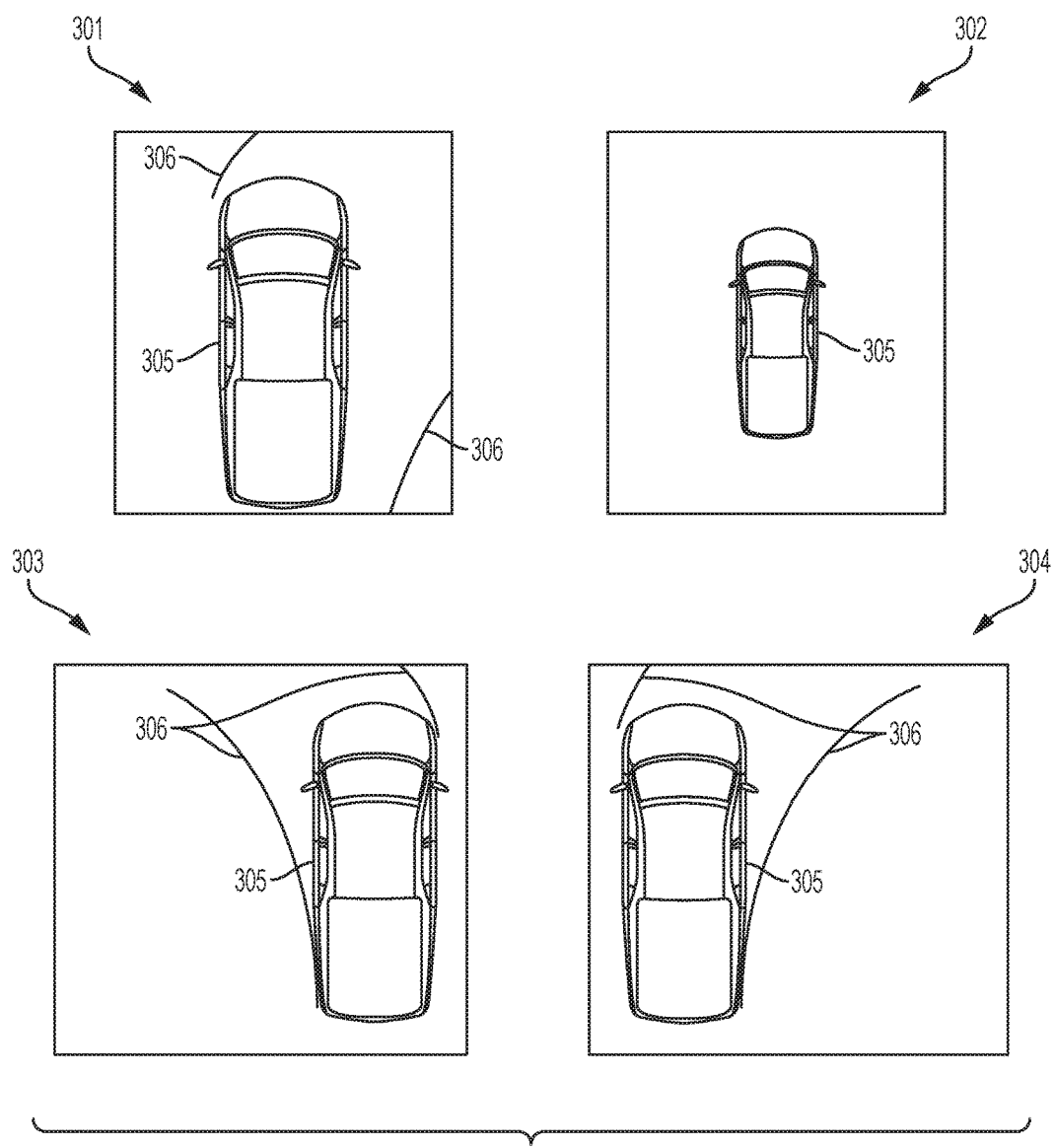
FIG. 3 shows illustrations of panning and zooming of a top view image of a vehicle or trailer according to an aspect of an exemplary embodiment.

FIG. 3 shows illustrations of panning and zooming of a top view image of a vehicle and/or trailer according to an aspect of an exemplary embodiment. The illustrations of FIG. 3 illustrate the top view images that may be displayed on the display.

Referring to FIG. 3, images 301-304 are images showing a top view of the vehicle 305 and its surroundings including guidelines 306 for a path or road taken by a vehicle and/or trailer. In particular, image 301 shows a standard zoomed in view of the top view image. Image 302 shows a zoomed out view that may be initiated by the vehicle trajectory, the presence of a trailer, the presence of an obstacle near the vehicle, the trailer trajectory, a user input or other condition.

In addition, FIG. 3 also shows image 303 in which the top view image is panned to the left in response to the trajectory of the vehicle and/or trailer or the trajectory of the path being a leftward trajectory. Similarly, image 304 shows a top view image that is panned to the right in response to the trajectory of the vehicle or the trajectory of the path being a rightward trajectory.

Figure 4:
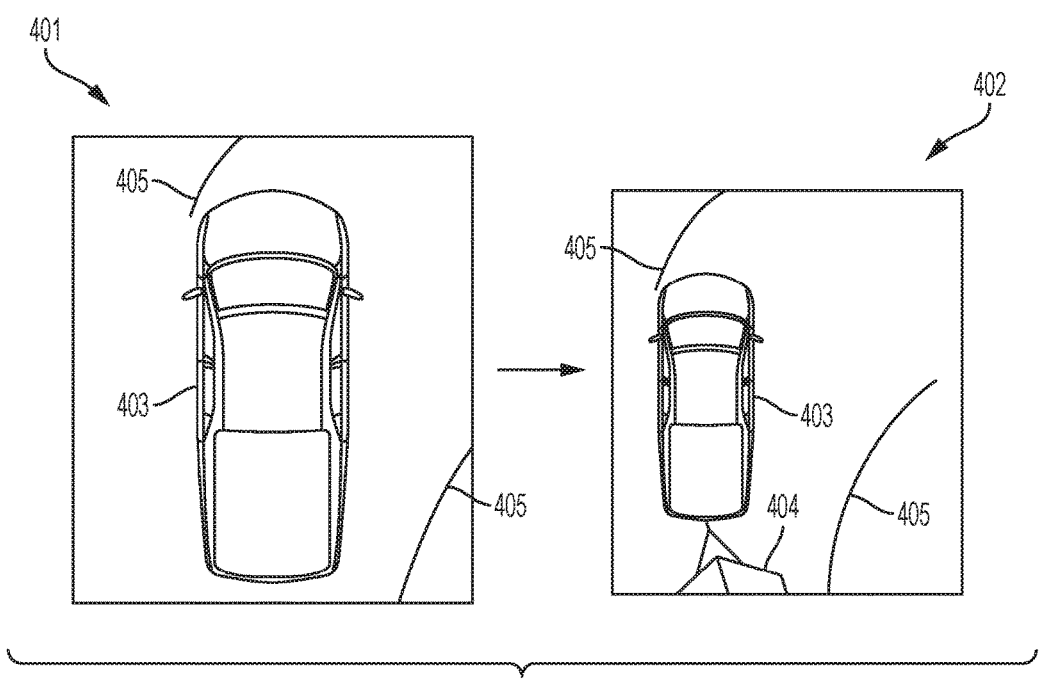
FIG. 4 shows illustrations of panning and zooming of a top view image of a vehicle or trailer according to an aspect of an exemplary embodiment.

FIG. 4 shows illustrations of panning and zooming of a top view image of a vehicle and/or trailer according to an aspect of an exemplary embodiment. Referring to FIG. 4, a first image 401 shows a fixed view and a second image 402 shows a dynamic view. Both images show vehicle 403 and guidelines 405. However, the second image 402 also shows a trailer 404 being displayed in response to detecting the trailer 404. In addition, the second image 402 may dynamically change by panning, zooming in, and/or zooming out of the image based on the trajectory of the vehicle, the presence of external obstacles, the trajectory of the path and/or other conditions.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for enhancing a top view image of a vehicle or trailer, the method comprising:
    receiving a plurality of images from a plurality of cameras disposed on the vehicle;
    transforming and stitching the plurality of images to form the top view image showing a predetermined area around the vehicle or a trailer;
    displaying the top view image;
    determining a trajectory of the vehicle or the trailer; and
    performing at least one from among:
        zooming the top view image of the vehicle or trailer based on the determined trajectory and based on whether the trailer is hitched to the vehicle; and
        panning the top view image based on the determined trajectory and based on whether the trailer is hitched to the vehicle,
    wherein the panning the top view image comprises panning the image to the right in response to the determined trajectory of the vehicle or trailer being a rightward trajectory and panning the image to the left in response to the determined trajectory of the vehicle or trailer being a leftward trajectory.

2. The method of claim 1, wherein the determining the trajectory of the vehicle or the trailer is performed based on at least one from among a steering angle of the vehicle, a wheel angle of the vehicle, a trailer hitch angle a heading of the vehicle, a speed of the vehicle, and a path of the vehicle.

3. The method of claim 2, further comprising determining whether a trailer is hitched to the vehicle.

4. The method of claim 3, wherein the zooming the top view image comprises zooming out of the top view image in response to the trailer being hitched to the vehicle and zooming into the top view image in response to the trailer being unhitched from the vehicle.

5. The method of claim 4, wherein the panning the image comprises panning the image to the right for a distance determined based on the rightward trajectory and panning the image to the left for a distance determined based on the leftward trajectory.

6. The method of claim 3, wherein the determining whether the trailer is hitched to the vehicle comprises detecting a connection to the trailer or receiving a user input indicating that the trailer is hitched to the vehicle.

7. The method of claim 1, wherein the zooming the top view image comprises zooming into or zooming out of the top view image in response to a user selection of an icon on the top view image.

8. An apparatus for enhancing a top view image of a vehicle or trailer, the apparatus comprising:
at least one memory comprising computer executable instructions; and
at least one processor configured to read and execute the computer executable instructions, the computer executable instructions causing the at least one processor to:
receive a plurality of images from a plurality of cameras disposed on the vehicle;
transform the plurality of images to form the top view image of the vehicle;
display the top view image of the vehicle;
determine a trajectory of the vehicle; and
perform at least one from among:
zooming into the top view image of the vehicle or trailer based on the determined trajectory and based on whether the trailer is hitched to the vehicle; and
panning the top view image based on the determined trajectory and based on whether the trailer is hitched to the vehicle,
wherein the computer executable instructions further cause the at least one processor to pan the top view image by panning the image to the right in response to the determined trajectory of the vehicle being a rightward trajectory and panning the image to the left in response to the determined trajectory of the vehicle being a leftward trajectory.

9. The apparatus of claim 8, wherein the computer executable instructions cause the at least one processor to determine the trajectory of the vehicle or the trailer based on at least one from among a steering angle of the vehicle, a wheel angle of the vehicle, a trailer hitch angle a heading of the vehicle, a speed of the vehicle, and a path of the vehicle.

10. The apparatus of claim 9, wherein the computer executable instructions cause the at least one processor to determine whether a trailer is hitched to the vehicle.

11. The apparatus of claim 10, wherein the computer executable instructions cause the at least one processor to zoom the top view image by zooming out of the top view image in response to the trailer being hitched to the vehicle and zooming into the top view image in response to the trailer being unhitched from the vehicle.

12. The apparatus of claim 11, wherein the computer executable instructions further cause the at least one processor to pan the image by panning the image to the right for a distance determined based on the rightward trajectory and panning the image to the left for a distance determined based on the leftward trajectory.

13. The apparatus of claim 8, wherein the computer executable instructions further cause the at least one processor to determine whether the trailer is hitched to the vehicle by detecting a connection to the trailer or receiving a user input indicating that the trailer is hitched to the vehicle, and
wherein the computer executable instructions further cause the at least one processor to zoom the top view image by zooming into or zooming out of the top view image in response to a user selection of an icon on the top view image.

14. The apparatus of claim 8, further comprising the plurality of cameras disposed on a vehicle.

15. The apparatus of claim 8, further comprising a display configured to display the top view image of the vehicle.

* * * * *